United States Patent [19]

Wilcox

[11] 3,812,387

[45] May 21, 1974

[54] MONOLITHIC HORIZONTAL PROCESSING CIRCUIT WITH SELECTABLE DUTY CYCLE

[75] Inventor: Milton E. Wilcox, Tempe, Ariz.

[73] Assignee: Motorola, Inc., Franklin Park, Ill.

[22] Filed: May 24, 1972

[21] Appl. No.: 256,523

[52] U.S. Cl................... 307/265, 307/261, 328/179, 331/10

[51] Int. Cl.............................................. H03k 1/18

[58] Field of Search...... 307/261, 265, 228; 328/34, 328/36, 179; 331/10, 1

[56] References Cited

UNITED STATES PATENTS

| | | | |
|---|---|---|---|
| 3,191,071 | 6/1965 | King et al. | 307/261 X |
| 3,548,318 | 12/1970 | Yorksie | 307/261 X |
| 3,577,012 | 5/1971 | Dummermuth | 307/228 X |

*Primary Examiner*—John Zazworsky
*Attorney, Agent, or Firm*—Vincent J. Rauner; Henry T. Olsen; Maurice J. Jones, Jr.

[57] ABSTRACT

A horizontal processing circuit in monolithic integrated circuit form for a television receiver, which processing circuit includes a horizontal oscillator, phase comparator, and predriver stage. The oscillator generates a sawtooth signal at approximately the desired frequency as determined by an external RC timing network, and which is locked in phase and frequency to the received television signal by the actions of the phase comparator. The sawtooth signal is applied to the predriver stage which includes an electronic switch which produces an output pulse of essentially square wave configuration. By controlling the setting of the switching threshold of the electronic switch, the width of the output pulse may be effectively controlled within a predetermined range or ratio such that the horizontal processing circuit may be rendered fully compatible within any horizontal sweep system whatever the design factors may be.

9 Claims, 3 Drawing Figures

MONOLITHIC HORIZONTAL PROCESSING CIRCUIT WITH SELECTABLE DUTY CYCLE

BACKGROUND OF THE INVENTION

This invention relates in general to television circuits and more particularly to a horizontal processing circuit suitable for use in the horizontal sweep section of a television receiver, which includes a provision for setting the duty cycle of the output signal to any desired ratio within a given range of values and wherein the component parts of the processing circuit are especially adapted for use with integrated circuit techniques.

In a conventional television receiver, whether monochrome or color, suitable provision is required to deflect one or more electron beams of the associated image reproducer both horizontally and vertically. For the horizontal direction, the required deflection rate is on the order of 15.75 kHz while the vertical deflection rate is 60 Hz. Further, the respective systems for deflecting the beam or beams at the required rate must be synchronized with the incoming or received television signal else the reproduced image will not remain stationary on the television screen. Appropriate information is included in the composite television signal itself, which when extracted, may be conveniently utilized for synchronization purposes.

The usual approach for television deflection systems has been to provide one or more reference or sweep oscillators in the receiver which are free running at approximately the desired frequency. If two such oscillators are incorporated, the vertical oscillator should operate at the 60 cycle Hz rate while the horizontal oscillator should have an oscillatory output on the order 15.75 kHz. If only one reference oscillator is to be used, it should of course have an output frequency which may be conveniently divided into the appropriate 60 cycle Hz vertical and 15.75 kHz horizontal signal frequencies. In any event, the respective oscillator signals are customarily applied to associated driver stages, the output of which may be utilized to drive vertical and horizontal output stages. The respective output stages are then used to control the action of appropriate vertical and horizontal deflection windings positioned about the image reproducer so as to effect the desired image display.

For a number of reasons, a considerable effort has been made in recent years to adapt substantial portions of the television receiver circuitry to integrated circuit form. One such area of the television set receiving appropriate attention in this regard has been the horizontal sweep section. While certain portions of this area are of a power level presently too high for adaptation to integrated circuitry, such as the driver and output stages, other portions are readily adaptable. For example, the horizontal oscillator and phase comparator can be advantageously combined in a single circuit in monolithic integrated circuit form and suitable for either monochrome or color television receivers.

The problem with arrangements of this type, however, is that the monolithic integrated circuit of the foregoing configuration would be compatible with a horizontal sweep system of a particularized design only. That is, a horizontal drive stage requires that the oscillatory signal as received from the associated horizontal oscillator exhibit a predetermined duty cycle, for biasing and other design considerations. By duty cycle, it is meant the ratio of the positive going portion of the referenced signal with respect to its negative going portion. This ratio is also at times referred to as a mark-space ratio or MSR. In any event, differing horizontal sweep systems require different duty cycles, or MSR's. Those systems employing solid state devices exhibit biasing requirements substantially different from those systems incorporating vacuum tubes for the output and/or driver stages. The same is true regarding deflection systems which incorporate controlled rectifiers, such as SCR's or the like.

SUMMARY OF THE INVENTION

Accordingly, it is an object of the present invention to provide an improved horizontal processing circuit for a television receiver which does not exhibit the aforementioned deficiencies.

A more particular object of the present invention is to provide a horizontal processing circuit which may be fabricated in monolithic integrated circuit form and which may be adapted for efficient operation in a wide variety of horizontal sweep systems in television receivers.

Still another object of the present invention is to provide a horizontal processor for a television receiver in integrated circuit form which includes a horizontal oscillator stage, the frequency and duty cycle of the output signal being effectively determined by the selectable, discrete components entirely external to the reference circuit, and thus readily accessible.

In accordance with one embodiment of the invention a horizontal processing circuit is provided in monolithic integrated circuit form, which circuit includes a horizontal oscillator, a phase comparator and a predriver circuit arrangement. The oscillator includes an external timing capacitor and resistor for determining the frequency of the generated sawtooth signal. The phase comparator generates a control signal in response to an applied sync signal and integrated fly-back pulse, which may then be utilized to insure a precise frequency match between the horizontal oscillator output and the synchronization pulses as extracted from the composite television signal in a manner known in the art.

The sawtooth signal from the horizontal oscillator is then coupled to a horizontal predriver stage, the output of which is essentially a square wave at the required horizontal frequency. The duty cycle or MSR of the predriver output signal, however, may be selectably controlled to meet the specific requirements of the associated horizontal driver stage with which the horizontal processing circuit is to be used. This is readily accomplished by using a semiconductor switch arrangement whose threshold is conveniently controlled by associated components external to the horizontal processing integrated circuitry.

Specifically, the semiconductor switch comprises a pair of interconnected NPN and PNP transistors wherein an open circuit voltage is applied to the emitter of the PNP transistor via an external resistor divider network. The sawtooth signal from the horizontal oscillator is applied to the input base of the NPN transistor. Accordingly, the PNP transistor will conduct on that portion of the applied sawtooth signal which is below the potential level of the referenced open circuit voltage as applied to the emitter of the PNP transistor. The PNP transistor is then used to control the conductivity of an additional pair of interconnected NPN transistors. Accordingly, the output pulse wave form of the predriver stage, or more correctly, its duration, is effectively controlled by the level of reference potential as applied to the emitter of the PNP control transistor from the external divider network. As the reference potential is raised between the limits of the potential swing of the sawtooth signal, the output pulse from the horizontal predriver stage becomes progressively wider. As the reference potential is reduced, the reverse pertains.

Accordingly, the novel features which are believed to be characteristic of the present invention are set forth with particularity in the appended claims. The invention itself, however, may best be understood by reference to the following description when taken in conjunction with the drawings, in which:

BRIEF DESCRIPTION OF THE EMBODIMENT

Figure 1:
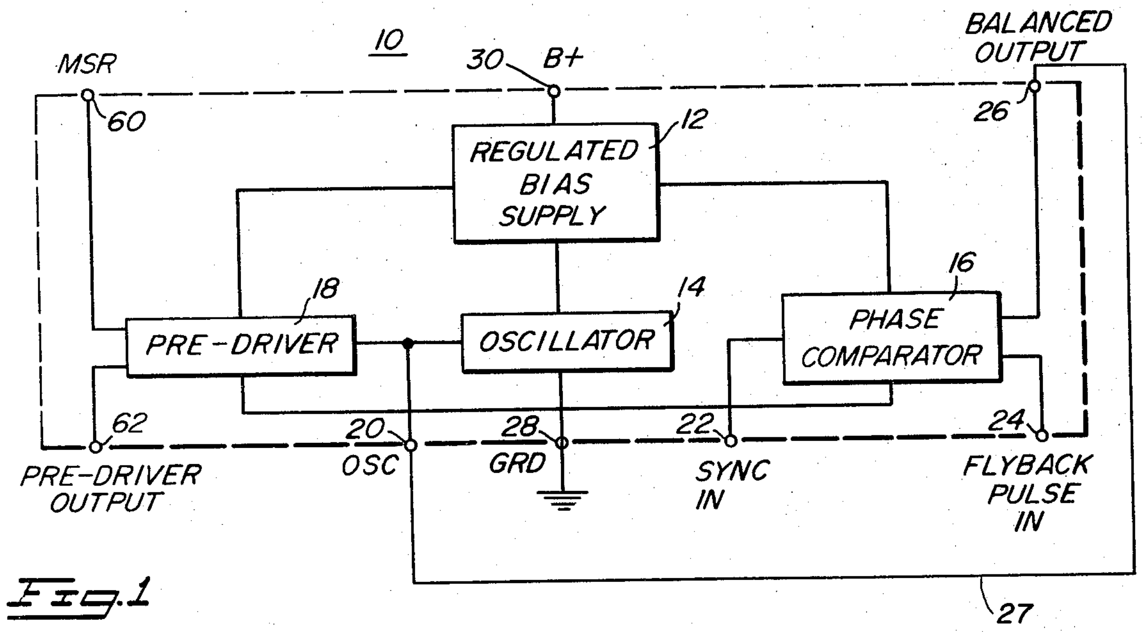
FIG. 1 is a block diagram of a horizontal processing circuit which is in monolithic integrated circuit form and which embodies principles and apparatus in accordance with the present invention.

Referring now to the drawings, a circuit 10 is shown in block diagram in FIG. 1 which has been constructed in accordance with the present invention, with the components enclosed in dotted lines being capable of fabrication in monolithic integrated circuit form. As indicated, circuit 10 includes a regulated bias supply arrangement 12 for supplying bias and operating power to the various component parts thereof, an oscillator stage 14, a phase comparator or detector stage 16 and a predriver stage 18. Circuit 10 is of course adapted for use as a horizontal processing circuit in the horizontal sweep section of a television receiver, whether monochrome or color.

Figure 3:
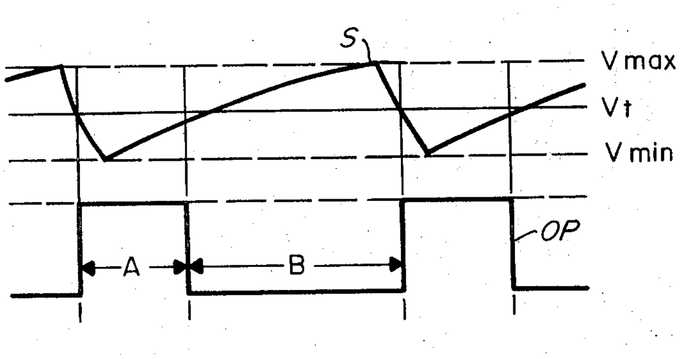
FIG. 3 is a graphic representation of input and output wave forms of the predriver stage of FIG. 1 and 2 which are useful in understanding an important aspect of the invention.

The horizontal processing circuit 10 is to be used with an external timing capacitor and resistor (not shown) in discrete form which when coupled to the associated bonding pad 20 causes the horizontal oscillator stage 14 to generate an output oscillatory sawtooth signal, such as that shown at S in FIG. 3. The frequency and voltage swing of the generated sawtooth signal is effectively determined by the time constant as presented by this external RC timing network in a manner well understood in the art such that further and more detailed description is deemed unnecessary.

The output of horizontal oscillator 14 is synchronized or phase locked to the sync pulses, as extracted from the composite television signal, by the action of the phase comparator 16. As indicated, sync pulses obtained from the composite signal by a sync separator (not shown) are coupled to a bonding pad 22, forming one input to the phase comparator 16. A sawtooth signal from an integrated fly-back pulse is coupled to the bonding pad designated at 24, forming a second input to phase comparator 16. Again, in a manner readily understood in the art, comparator 16 will generate an appropriate output control signal if an error is found between the applied sync and fly-back pulses, which error control voltage appears at associated bonding pad 26. The output of phase comparator 16 may then be applied through circuit 27 and utilized in a conventional manner to control the frequency and phase of the horizontal oscillator 14.

As thus far described, horizontal processing circuit 10 is essentially conventional in form and operation. However, the oscillatory sawtooth signal as generated by horizontal oscillator stage 14 would be compatible within a horizontal sweep system of a particularized design only. That is, one which requires a duty cycle, or MSR, substantially as exhibited by the output signal from horizontal oscillator 14 without further modification. As mentioned previously, however, differing horizontal sweep systems require oscillatory signals with differing duty cycles. A system incorporating vacuum tubes in the horizontal output and/or driver stages presents biasing and other operational factors substantially different from, say, solid state sweep systems.

Figure 2:
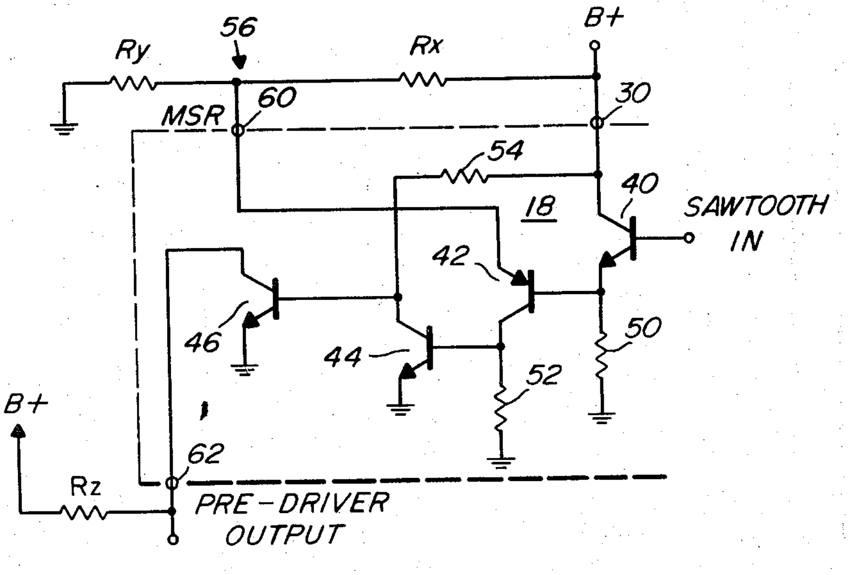
FIG. 2 is a partial schematic diagram which illustrates the predriver stage of FIG. 1 in detail, together with an associated but externally positioned resistive voltage-divider network.

In accordance with the present invention, the horizontal processing circuit 10 is made compatible with any horizontal sweep system by the action of the additional predriver stage 18 included in the overall circuit 10, the operation of which may now be considered. As shown in FIG. 2, predriver stage 18 includes an NPN transistor 40 having its emitter connected to the base of a PNP transistor 42. The collector of transistor 42 is connected to the base of a NPN transistor 44 which in turn has its collector electrode connected to the base of a further NPN transistor 46. As indicated, the emitters of transistors 44 and 46 are returned directly to ground, or more accurately, to an associated bonding pad 28, in turn, to be connected to a plane of reference potential, i.e., ground. Additionally, the emitter of transistor 40 is connected to ground through a resistance 50 and the collector of PNP transistor 42 is returned to ground through a resistance 52. Operating power is applied to the collector of transistor 40 and through an additional resistance 54 to the collector of transistor 44. The input to predriver stage 18 is formed by the base electrode of transistor 40 and the output is taken at the collector of transistor 46. In addition, an external resistive voltage-divider network 56, formed by resistors $R_x$ and $R_y$ in discrete form. Resistors $R_x$ and $R_y$ may be serially connected between the source of operating potential as applied to bonding pad 30 and ground reference, with the junction thereof connected to a bonding pad 60. Bonding pad 60 is coupled to the emitter of PNP transistor 42, as indicated. A further resistance $R_z$ is coupled between a source of potential, such as B+, and the output collector of transistor 46 at bonding pad 62. This resistance applies a given voltage thereto when the transistor 46 is in the nonconductive state, as will be subsequently explained.

In operation, the oscillatory sawtooth signal generated by the horizontal oscillator 14 is applied to the base input of transistor 40. This sawtooth signal has a voltage excursion as represented at $V_{min}$ and $V_{max}$ in FIG. 3. Additionally, an open circuit potential $V_t$ is applied to the emitter of PNP transistor 42, as determined by the voltage-divider network 56. It may be assumed that the reference potential $V_t$ falls between the limits of $V_{min}$ and $V_{max}$ substantially as that shown in FIG. 3.

Accordingly, that portion of the sawtooth signal which is below the potential level of $V_t$ causes transistor 42 to become conductive. Conduction of transistor 42 causes transistor 44 to likewise be biased into conduction. This in turn effectively biases off transistor 46, and the potential appearing at the collector output electrode as applied via resistance $R_z$ is relatively high. That is, as compared to the potential at its collector electrode in the conductive state. When the output of transistor 46 is at the high level, non-conductive state, it effectively has the saturation impedance of transistor 44 in its base, allowing the collector of transistor 46 to go very high, since a $BV_{CER}$ condition is present.

When, however, the sawtooth signal at the base of transistor 42 is above the level of reference as established by $V_t$ at its emitter, transistor 42 is effectively biased to the nonconductive state. Accordingly, transistor 44 is likewise cut off and transistor 46 is rendered fully conductive, bringing its output collector electrode effectively to ground potential.

In this manner, an output pulse is formed at the output collector of transistor 46 by the sawtooth signal applied to the input base of transistor 40 from horizontal oscillator stage 14. The phase and frequency of the output signal from predriver stage 18 is the same as the applied sawtooth signal. However, the duty cycle thereof, or MSR, is effectively controlled by the external resistive voltage-divider network 56 which in turn sets the threshold of the electronic switch formed by NPN-PNP transistors 40 and 42. It will be readily understood that as the reference potential $V_t$ is raised between the limits of the voltage excursion of the sawtooth signal S as indicated at $V_{min}$ and $V_{max}$, the positive output pulse OP from the predriver stage 18 will become progressively wider. As the reference potential $V_t$ is reduced in value, the pulse thus becomes progressively narrower. In this manner, it has been found that the width of the output positive pulse, indicated at reference A, can be effectively varied from a condition where it is some eight times greater than the width of the negative portion, indicated at reference B, to a condition where the positive portion A is approximately one-eighth that of the negative portion B. Accordingly, this permits the selection of a duty cycle, or MSR, anywhere within the range of 8:1 to 1:8 simply and expeditiously by the values as selected for the resistances $R_x$ and $R_y$ in the voltage-divider network 56. The height or magnitude of the output pulse is of course determined by the level of operating potential B+ and the value of the resistance $R_z$.

What is claimed is:

1. A horizontal processing circuit in monolithic integrated circuit form for a television receiver for providing an output oscillatory signal of substantially square wave configuration and predetermined frequency wherein the duty cycle thereof may be preset to a desired ratio, including in combination:

a horizontal oscillator having a terminal, said horizontal oscillator generating an oscillatory signal of essentially sawtooth configuration;

a phase comparator for developing a control signal at an output terminal thereof in response to applied signal information, said output terminal of said phase comparator being connected to said horizontal oscillator to synchronize said sawtooth signal from said horizontal oscillator to said predetermined frequency; and a predriver having an input terminal connected to said terminal of said horizontal oscillator, said predriver transforming said sawtooth signal to one of essentially square wave configuration at said predetermined frequency, said predriver including electronic switch means which when actuated produces an output pulse and means external to the monolithic integrated circuitry for selectively controlling the setting of a switching threshold for said electronic switch means.

2. A horizontal processing circuit in accordance with claim 1 wherein said electronic switch means includes a pair of interconnected semiconductor devices with the sawtooth signal being coupled to one of said devices and a reference voltage coupled to a control electrode of the other of said devices and wherein said other semiconductor device is rendered conductive and nonconductive as the voltage excursion of said sawtooth signal swings above and below said established reference potential.

3. A horizontal processing circuit in accordance with claim 1 wherein said predriver includes first switch means comprising a NPN transistor interconnected to a PNP transistor, second switch means comprising a pair of interconnected NPN transistors, means for applying said sawtooth signal to said first switch means, means for connecting said first switch means to said second switch means, means for establishing a first reference potential at a control electrode of said PNP transistor, the level of which determines said switching threshold of said first switch means, and means for establishing a second reference voltage at an output terminal of said second switch means.

4. A horizontal processing circuit in accordance with claim 1 wherein said electronic switch means includes a NPN transistor coupled to a PNP transistor and wherein said means for setting the switching threshold of said electronic switch means includes means for establishing a reference voltage at a control electrode of said PNP transistor whereby the same is rendered conductive only when said sawtooth signal as applied to said NPN transistor is below the level of said reference voltage.

5. A horizontal processing circuit in accordance with claim 1 wherein said predriver includes a first NPN transistor having an emitter output connected to the input base of a PNP transistor, a second NPN transistor having an input base connected to the output collector of said PNP transistor and an output collector connected to the input base of a third NPN transistor, said predriver having an input at the base of said first NPN transistor at which said sawtooth signal is applied and an output taken at the collector of said third NPN transistor.

6. A horizontal processing circuit in accordance with claim 5 wherein said first NPN transistor and said PNP transistor comprise said electronic switch means and wherein said means for setting the threshold of said switch means includes a resistive voltage-divider network in discrete form external to said integrated circuitry for establishing a reference potential at the emitter of said PNP transistor.

7. A horizontal processing circuit in accordance with claim 1 wherein the electronic switch means includes in combination:

first switch means including a first transistor having a first conductivity type interconnected with a second transistor having a second conductivity type;

second switch means having a pair of interconnected third and fourth transistors both of said first conductivity type;

circuit means connecting said first switch means to said second switch means; and resistive voltage-divider means having a terminal connected to a control electrode of said second transistor, said resistive voltage divider means establishing a reference potential at said control electrode of said second transistor which determines the switching threshold of said first switch means.

8. The electronic switch circuit of claim 7 wherein:

all of said transistors are bipolar transistors each having emitter, base and collector electrodes, said base electrode of said first transistor forming an input terminal for the electronic switch circuit, said emitter electrode of said first transistor being connected to said base electrode of said second transistor and said collector electrode of said first transistor being connected to a first power supply terminal;

first resistive means connecting said emitter electrode of said first transistor and said base electrode of said second transistor to a second power supply terminal;

said collector electrode of said second transistor being connected to said base electrode of said third transistor;

second resistive means connecting said base electrode of said third transistor and said collector electrode of said second transistor to said second power supply terminal, said emitter electrode of said second transistor being connected to said resistive voltage divider means;

said collector electrode of said third transistor being connected to said base electrode of said fourth transistor;

third resistive means connecting said collector electrode of said third transistor and said base electrode of said fourth transistor to said collector electrode of said first transistor;

said emitter electrodes of said third and fourth transistors being connected to said second power supply terminal; and said collector electrode of said fourth transistor being connected to the output terminal of the electronic switch circuit.

9. The electronic switch circuit of claim 8 further including fourth resistive means connecting said collector electrode of said fourth transistor to said first power supply terminal.

* * * * *